(12) United States Patent
Kern et al.

(10) Patent No.: US 8,065,543 B2
(45) Date of Patent: Nov. 22, 2011

(54) METHOD, SYSTEM, AND APPARATUS FOR DYNAMIC CLOCK ADJUSTMENT

(75) Inventors: Frank William Kern, Bellingham, WA (US); Edward Stanford, Du Pont, WA (US)

(73) Assignee: Intel Corporation, Santa Clara, CA (US)

(*) Notice: Subject to any disclaimer, the term of this patent is extended or adjusted under 35 U.S.C. 154(b) by 365 days.

(21) Appl. No.: 12/380,933

(22) Filed: Mar. 5, 2009

(65) Prior Publication Data

US 2009/0177904 A1 Jul. 9, 2009

Related U.S. Application Data

(63) Continuation of application No. 11/479,593, filed on Jun. 30, 2006, now Pat. No. 7,818,595.

(51) Int. Cl.
*G06F 17/50* (2006.01)
*G06F 27/28* (2006.01)

(52) U.S. Cl. ........ 713/322; 713/300; 713/310; 713/320; 713/321; 713/323; 713/324; 713/330; 713/340; 702/57; 702/189

(58) Field of Classification Search .......... 713/300, 713/310, 320–324, 330, 340; 702/57, 189
See application file for complete search history.

(56) References Cited

U.S. PATENT DOCUMENTS

| | | | |
|---|---|---|---|
| 5,963,023 A | 10/1999 | Herrell et al. | |
| 6,163,499 A | 12/2000 | Suzuki | |
| 6,360,431 B1 | 3/2002 | Harrison | |
| 6,501,251 B1 | 12/2002 | Mosley | |
| 6,523,353 B2 | 2/2003 | Evans | |
| 6,535,395 B2 | 3/2003 | Harrison | |
| 6,768,952 B2 * | 7/2004 | Kantorovich et al. | 702/65 |
| 6,911,827 B2 * | 6/2005 | Kantorovich et al. | 324/615 |
| 6,930,889 B2 | 8/2005 | Harrison | |
| 7,203,608 B1 * | 4/2007 | Aikawa et al. | 702/57 |
| 7,818,595 B2 * | 10/2010 | Kern et al. | 713/322 |
| 2002/0105382 A1 | 8/2002 | Kadanka | |
| 2004/0246811 A1 | 12/2004 | Best et al. | |
| 2005/0048336 A1 | 3/2005 | Takebe et al. | |
| 2005/0149770 A1 | 7/2005 | Koertzen et al. | |
| 2005/0149894 A1 | 7/2005 | Shimazaki et al. | |
| 2006/0273776 A1 | 12/2006 | Smart et al. | |
| 2007/0216477 A1 | 9/2007 | McConnell | |
| 2008/0252459 A1 | 10/2008 | Butler et al. | |

* cited by examiner

*Primary Examiner* — Abdelmoniem Elamin
(74) *Attorney, Agent, or Firm* — Paul E. Steiner

(57) ABSTRACT

A method, apparatus, article of manufacture, and system, the method including, in some embodiments, determining an impedance of a power distribution network of a load for a range of frequencies, and adjusting a functionality of the load based on a relationship between the impedance of the power distribution network for the range of frequencies and the functionality of the load.

6 Claims, 4 Drawing Sheets

100

```
┌─────────────────────────────────────┐
│     DETERMINE AN IMPEDANCE OF A     │
│    POWER DISTRIBUTION NETWORK OF    │
│   A LOAD FOR A RANGE OF FREQUENCIES │
│                                 105 │
└─────────────────────────────────────┘
                  │
                  ▼
┌─────────────────────────────────────┐
│   ADJUST A FUNCTIONALITY OF THE LOAD│
│   BASED ON A RELATIONSHIP BETWEEN THE│
│   IMPEDANCE OF THE POWER DISTRIBUTION│
│   NETWORK AND A FUNCTIONALITY OF THE LOAD│
│                                 110 │
└─────────────────────────────────────┘
```

*FIG. 1*

METHOD, SYSTEM, AND APPARATUS FOR DYNAMIC CLOCK ADJUSTMENT

RELATED APPLICATIONS

This application is a continuation of U.S. patent application Ser. No. 11/479,593, filed Jun. 30, 2006 now U.S. Pat. No. 7,818,595.

BACKGROUND

The reliability and stability of a device, system, platform, or operating environment may depend on the device, system, platform, or operating environment functioning within design specifications. Due to a number of factors, attempts may be made to operate a device, system, platform, or operating environment outside of the design specifications. In some instances, an out of specification condition may result from component and system degradations that may typically occur over time. In some instances however the out of specification condition may be the result of, for example, manufacturing variations.

Operationally, an out of specification operating condition may result in a decrease in device and system reliability and stability.

BRIEF DESCRIPTION OF THE DRAWINGS

FIG. 1 is an exemplary flow diagram of a process, in accordance with some embodiments herein;

DETAILED DESCRIPTION

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

FIG. 1 is exemplary flow diagram of a process 100, in accordance with some embodiments herein. At operation 105, a determination is made of an impedance of a power distribution network of a load for a range of frequencies. In some embodiments, the power distribution network of the load includes all aspects, components, and devices of a power distribution network of the load. For example, the power distribution network may include all connectors, wires, and traces that supply power to the load and provide a ground return path to the load. Additionally, the power distribution network may also include related voltage regulation circuits (e.g., inductors, switching field effect transistors, control elements, etc.) and other associated circuits such as, for example, a signal conditioner (e.g., a filter, etc.).

The determination of the impedance at operation 105 may be done at more than one frequency, over a range of frequencies. In some embodiments the range of frequencies may correspond to an actual, potential, or designed range of operating frequencies of the load. In some embodiments, the range of frequencies may correspond to a specification or tolerance for an operating frequency used by the load. The operating frequency of the load may be controlled by a clock mechanism. In some embodiments, the load may include any number and variety of devices that include a clock mechanism to control an operational frequency or speed thereof. In some embodiments, the load may include a microprocessor, a multi-core microprocessor, a core of a microprocessor, and combinations thereof.

At operation 110, a functionality of the load is adjusted based on a relationship between the determined impedance of the power distribution network and the functionality of the load. In some embodiments, the functionality of the load that is adjusted is an operating frequency of the load. In accordance with some embodiments herein, the relationship used as a basis for the adjustment may be applicable for the range of frequencies used in operation 105.

Figure 2:
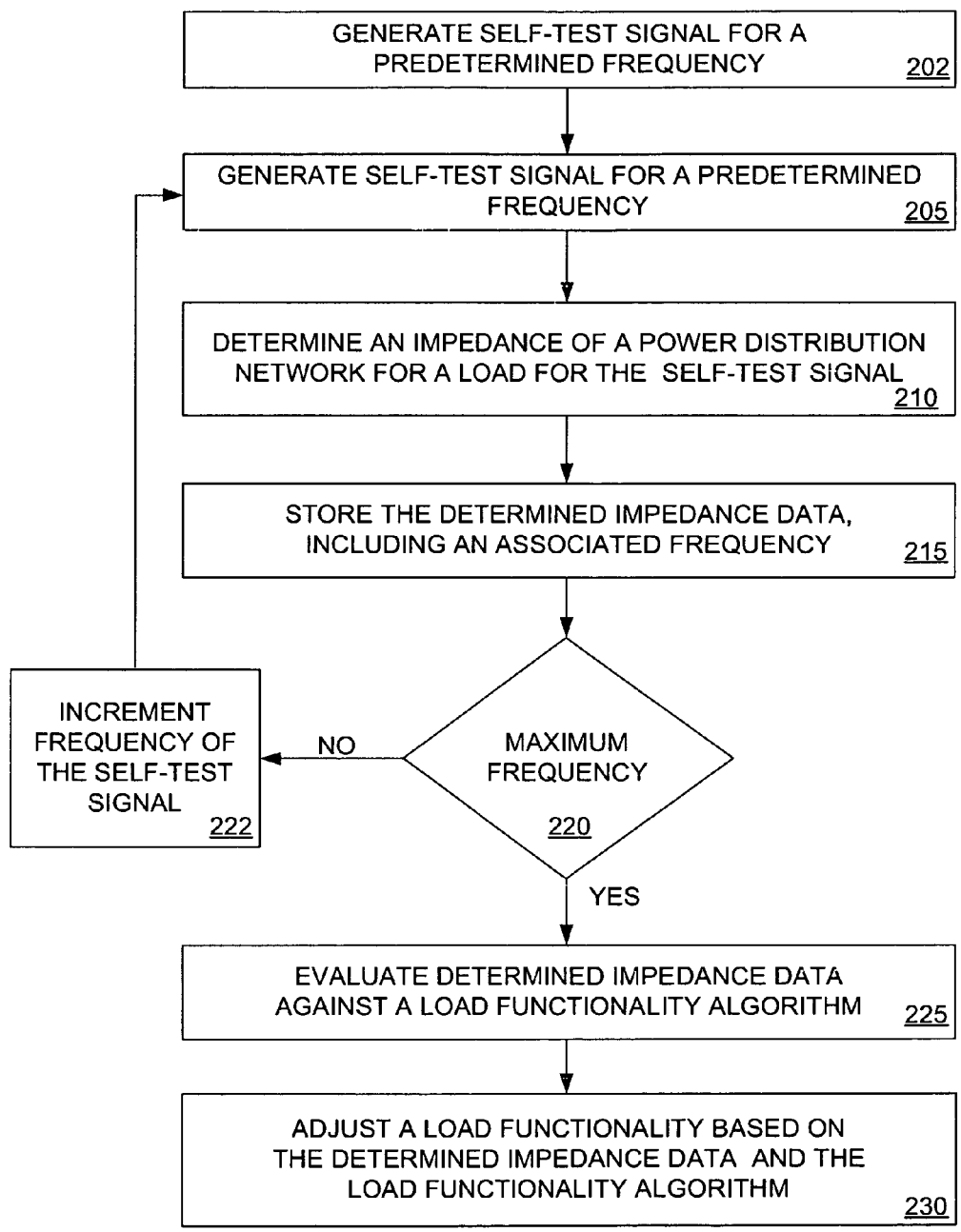
FIG. 2 is an exemplary flow diagram of a process, in accordance with some embodiments herein.

FIG. 2 is exemplary flow diagram of a process 200, in accordance with some embodiments herein. In some embodiments, process 100 is a high-level overview of process 200. It is noted however that processes other than process 200, including those with more, fewer, and different operations, may be used to implement the operations of FIG. 1.

At operation 202, an initial frequency of a test signal is identified. The initial frequency may be selected to correlate to a frequency known to be within a design specification of the load. At operation 205, a signal at the determined frequency is generated that will be used to sample an impedance of the power distribution network of a load. In some embodiments, process 200 is automatically initiated when the power load is turned on. That is, process 200 is initiated upon a power-on of the load. In some embodiments herein, process 200 may be referred to as a self-test since the process may be automatically initiated upon power-on and tests certain aspects of its self. The self-test signal may be a square wave or other type of wave.

At operation 210, a determination of the impedance of the power distribution network for the load using the self-test signal is performed. Operation 210 may include setting the signal generator that supplies the self-test signal to a minimum or fundamental frequency for an initial determination of the impedance of the power distribution network. The minimum frequency may be a predetermined frequency that is known to be within the operational specifications for the load of the power distribution network.

Operation 210 may further include making measurements of the power distribution network to determine the impedance thereof. For example, current and voltage measurements of the power distribution network under test may be made in order to calculate the impedance of the power distribution network.

A Fast Fourier Transform (FFT) operation maybe used to determine the impedance using the values of the measurement results and the input signal frequency. The FFT operation calculates the impedance at the frequency of the test signal. In some embodiments, other calculation techniques and processes may be used.

At operation 215, the impedance data determined at operation 210 is stored. The stored impedance data includes an indication of the frequency of the test signal used to determine the impedance. That is, the frequency associated with the determined impedance calculation is also stored at operation 215. A temporary register, cache, and other type of memory may be used to store the determined impedance and associated frequency data.

At operation 220, a determination is made whether a maximum frequency for the determined impedance has been used in the determination of the impedance of the power distribution network. In an instance where the maximum frequency for the determined impedance has not been reached, then process 200 proceeds to operation 222. At operation 222, the frequency of the test signal is incremented by a predetermined amount. The predetermined amount of the frequency increase may be a fixed amount and, in some embodiments, a variable increment. In this regard, a signal generator used to generate the self-test signal may be a variable signal generator. From operation 222, process 200 returns to operation 205 where the impedance test routine (205, 210, 215, 220) is repeated for each incremental frequency.

If the maximum frequency for the determined impedance has been used in determining the impedance of the power distribution network then process 200 proceeds to operation 225.

The maximum frequency considered at operation 220 may be a predetermined upper limit of an acceptable operating frequency of the load (e.g., design specified).

At operation 225, the impedance data, including the associated frequency, are evaluated. The evaluation of operation 225 may take into consideration the operational and functional limitations of the load. For example, functional limitations impacting the performance, reliability, and stability of the load may be of particular interest and considered in the evaluation. In some embodiments, a functionality of the load may be adjusted and configured based on the impedance data and the relationship of same with the functionality of the load. An algorithm relating to the determined impedance data and the functionality of the load may be used to evaluate the impedance data.

At operation 230, a functionality of the load may be adjusted based on the evaluation of the algorithm relating to the determined impedance data and the functionality of the load. In some embodiments, a functionality of the load may be adjusted based on the impedance of the power distribution network. In particular, an operating frequency of the load may be adjusted based on the determined impedance of the power distribution network.

In some embodiments, a device (i.e., a load) including a clock or a clocked operation may be adjusted in accordance with some embodiments herein where the device's clock speed is a function of the impedance of the power distribution network of the load. For example, the methods herein may be applied in the context of a device, system, or circuit having a microprocessor with one or more cores where the clock speed of the one or more cores is a function of the impedance of the power distribution network of the microprocessor. In some embodiments, a maximum (minimum) processor frequency of operation for the microprocessor may be limited by the impedance of the power distribution network of the microprocessor. The maximum (minimum) processor frequency may be bounded by the acceptable functional limits of the microprocessor and the load.

For example, if the impedance of the distribution network is over (under) a certain threshold, then the operating frequency of the microprocessor may have to be lowered (raised) to avoid an unstable or unreliable operating condition. In this manner, a core speed of the processor may be adjusted to a speed compatible with the determined impedance of the power distribution network.

Figure 3:
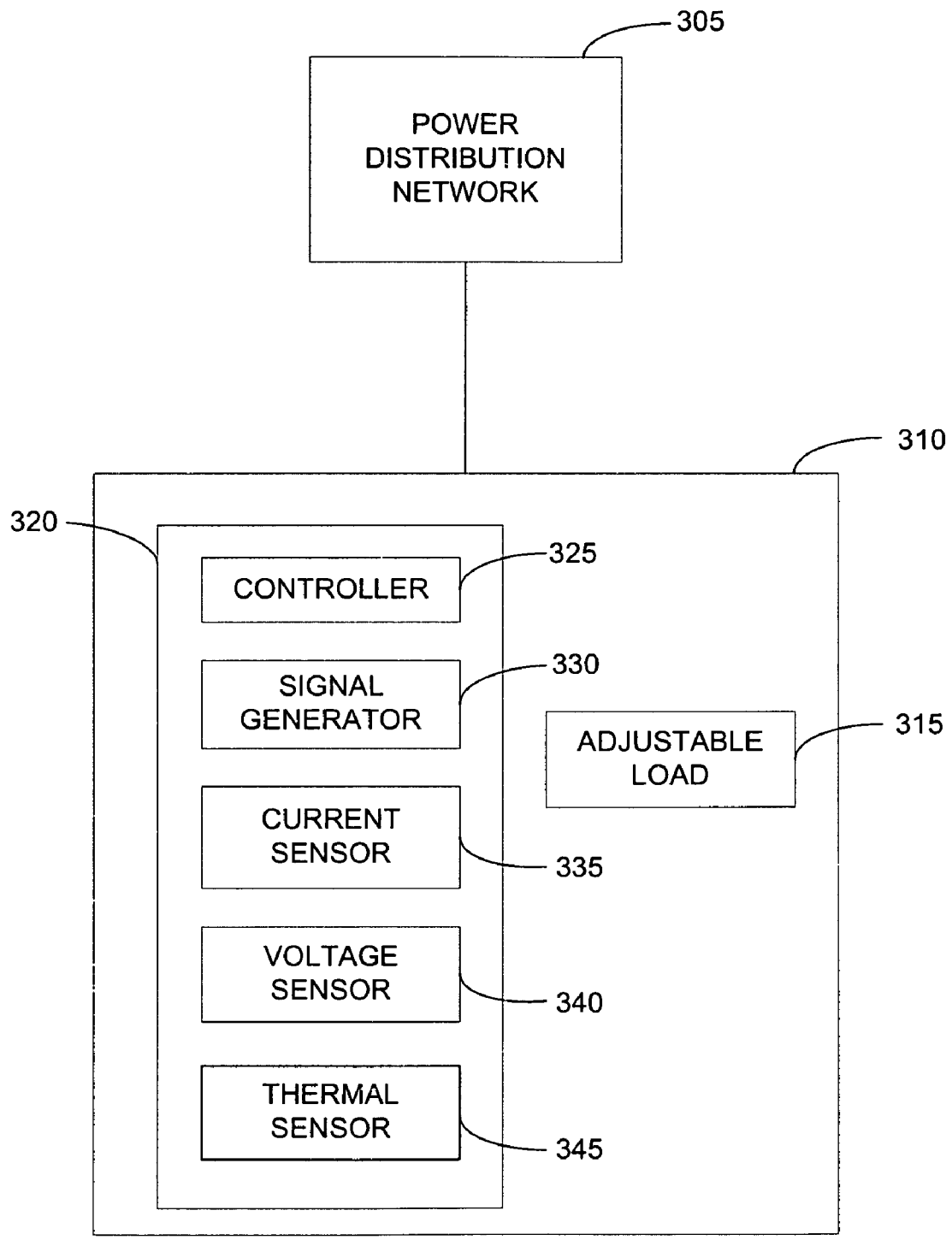
FIG. 3 is an exemplary depiction of an apparatus, in accordance with some embodiments herein.

FIG. 3 is an exemplary depiction of an apparatus 300, in accordance with some embodiments herein. Apparatus 300 may include more, fewer, and alternate components and devices than those shown in FIG. 3. A power distribution network 305 supplies power to load 310. Load 310 may be a microprocessor including one or more processor cores. Device 320 provides a mechanism for implementing a power-on impedance self-test, in accordance with embodiments herein.

Device 320 may include a controller 325 to control various aspects of the power-on impedance self-test in accordance with embodiments herewith, a signal generator 330 that may generate variable frequency signals, a current sensor 335 to measure a current, a voltage sensor 340 to measure a voltage, and a thermal sensor 345 to measure a temperature of load 410. In some embodiments, device 320 is included on the same die as an adjustable load 315 (e., a microprocessor). Device 320 and load 315 may be included on the same die, same package, same circuit board, etc. at a time of manufacture so that, for example, the control of the adjustment of the functionality of load is specifically matched to load 310.

In this manner, the functionality of load 310 may be dynamically adjusted by device 320 to match the impedance of a power distribution network 305, including an instance where the impedance of the power distribution network changes. The impedance of a power distribution network may change over a period of time due to component/system degradation. The impedance of a power distribution network may also change over a period of time due to variances in manufacturing processes, including, for example, quality control issues.

Controller 325 may operate in accordance with some embodiments herein. Controller 325 may execute code and program instructions to implement some of the methods and operations disclosed herein. In some embodiments, device 320 and controller 325 may include a register or cache (not shown) to store impedance data.

Figure 4:
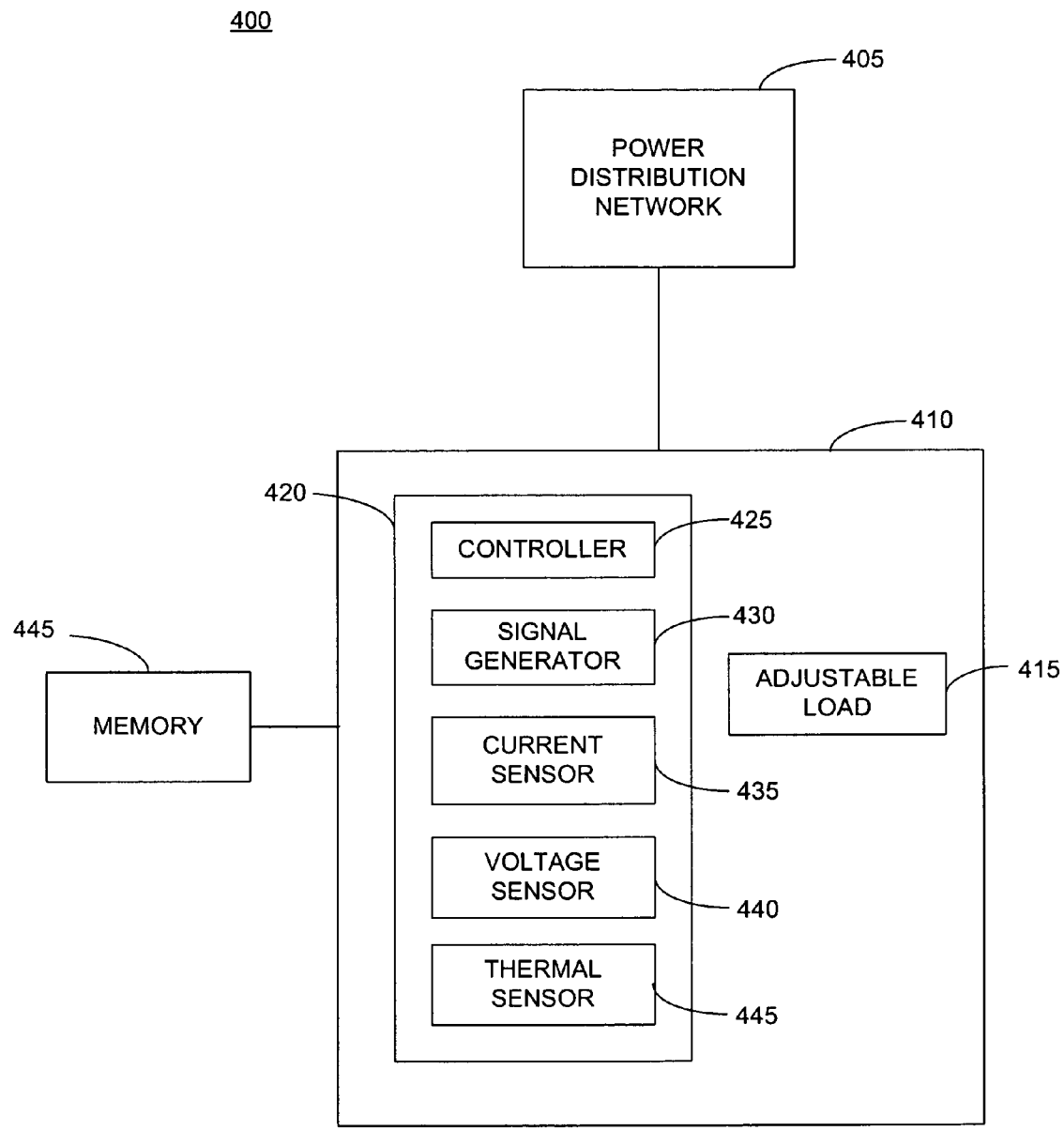
FIG. 4 is an exemplary depiction of a system, according to some embodiments herein.

FIG. 4 is an exemplary depiction of a system 400, in accordance with some embodiments herewith. System 400 may include a power distribution network 405 that supplies power to a load 410, including one or more processor cores. Device 420 may include a controller 425 to control various aspects of a power-on impedance self-test in accordance with embodiments herewith, a variable signal generator 430, a current sensor 435, a voltage sensor, and a thermal sensor. In some embodiments, device 420 is included on the same die as microprocessor array 415. Device 420 may control, for example, an adjustment of the functionality of a microprocessor array 415 to correspond to an impedance of power distribution network 405. System 400 may also include a memory 445 attached to load 410.

Those in the art should appreciate that system 400 may include additional, fewer, or alternative components to power distribution network 405, load 410, device 420, and memory 445. Memory 445 may comprise any type of memory for storing data, including but not limited to a Single Data Rate Random Access Memory, a Double Data Rate Random Access Memory, or a Programmable Read Only Memory.

System 400 may be a part of a larger system, device, or network device. For example, system 400 may comprise a personal computer, a mobile computing/computing device, and a network server.

It should be appreciated that the drawings herein are illustrative of various aspects of the embodiments herein, not exhaustive of the present disclosure.

What is claimed is:

1. A method of managing a power distribution network, comprising:
    powering on a device coupled to the power distribution network, the device receiving a clock signal and the power distribution network including a voltage regulator to supply power to the device; and
    initiating a test of the device upon power-on, the test including:
        determining impedance related data based on the operation of the device, the impedance related data based on voltage information and clock speed information;
        storing the impedance related data over a range of operating conditions;
        evaluating the operation of the device based on the stored impedance related data; and
        adjusting the operation of the device based on the evaluation.

2. The method of claim 1, wherein initiating the test of the device upon power-on comprises:
    initiating a self-test of the device upon power-on.

3. The method of claim 2, wherein the self-test is performed automatically upon power-on of the device.

4. The method of claim 3, wherein the device includes a processor.

5. The method of claim 3, wherein the device includes a multi-core microprocessor.

6. The method of claim 3, wherein the device includes a core of a multi-core microprocessor.

* * * * *